United States Patent
Parchami et al.

(10) Patent No.: US 12,046,047 B2
(45) Date of Patent: Jul. 23, 2024

(54) OBJECT DETECTION

(71) Applicant: Ford Global Technologies, LLC, Dearborn, MI (US)

(72) Inventors: Mostafa Parchami, Ann Arbor, MI (US); Xiaomin Li, San Marcos, TX (US); Enrique Corona, Canton, MI (US); Kunjan Singh, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 402 days.

(21) Appl. No.: 17/544,050

(22) Filed: Dec. 7, 2021

(65) Prior Publication Data
US 2023/0177842 A1  Jun. 8, 2023

(51) Int. Cl.
*G06T 7/20* (2017.01)
*B60W 30/09* (2012.01)
(Continued)

(52) U.S. Cl.
CPC ............ *G06V 20/58* (2022.01); *B60W 30/09* (2013.01); *G06N 3/04* (2013.01); *G06T 7/10* (2017.01);
(Continued)

(58) Field of Classification Search
CPC .......... G06T 2207/10016; G06T 7/246; G06T 2207/30241; G06T 7/20; G06T 2207/10004; G06T 2207/20081; G06T 2207/20084; G06T 7/215; G06T 7/73; G06T 2207/10021; G06T 2207/30196;
(Continued)

(56) References Cited

U.S. PATENT DOCUMENTS 5,706,417 A   1/1998   Adelson
5,787,199 A   7/1998   Lee
(Continued)

FOREIGN PATENT DOCUMENTS

CN   102201121 A   9/2011
CN   101582160 B   9/2013
(Continued)

OTHER PUBLICATIONS

Non-FInal Office Action for U.S. Appl. No. 16/155,048 as issued by the USPTO on Sep. 28, 2022.
(Continued)

*Primary Examiner* — Quan M Hua
(74) *Attorney, Agent, or Firm* — Frank A. MacKenzie; Bejin Bieneman PLC

(57) ABSTRACT

A segmentation mask can be determined that includes at least one moving object in a plurality of images based on determining eccentricity for each pixel location in the plurality of images. A first image included in the plurality of images can be segmented by applying the segmentation mask to the image. The segmented first image can be transformed to a compressed dense matrix which includes pixel values for non-zero portions of the segmented first image. The compressed dense matrix can be input to a sparse convolutional neural network trained to detect objects. A detected object corresponding to the at least one moving object included in the first image can be output from the sparse convolutional neural network.

20 Claims, 8 Drawing Sheets

(51) Int. Cl.
*G06N 3/04* (2023.01)
*G06T 7/10* (2017.01)
*G06V 10/82* (2022.01)
*G06V 20/58* (2022.01)

(52) U.S. Cl.
CPC ....... *G06V 10/82* (2022.01); *B60W 2420/403* (2013.01)

(58) Field of Classification Search
CPC . G06T 2207/30236; G06T 2207/30252; G06T 7/0016; G06T 7/11; G06T 7/13; G06T 7/248; G06T 7/254; G06T 7/277; G06T 7/285; G06T 7/33; G06T 7/37; G06T 7/579; G06T 7/593; G06T 7/70; G06V 20/54; G06V 20/56; G06V 10/16; G06V 10/25; G06V 10/24; G06V 10/225; G06V 10/768; G06V 10/80; H04N 19/543; H04N 23/00; H04N 23/80; H04N 5/145; H04N 13/128
See application file for complete search history.

(56) References Cited

U.S. PATENT DOCUMENTS

| | | |
|---|---|---|
| 6,580,812 B1 | 6/2003 | Harrington |
| 6,956,469 B2 | 10/2005 | Hirvonen et al. |
| 7,149,328 B2 | 12/2006 | Kamijo et al. |
| 7,418,113 B2 | 8/2008 | Porikli et al. |
| 7,710,461 B2 | 5/2010 | Nagano et al. |
| 7,881,497 B2 | 2/2011 | Ganguli et al. |
| 7,920,959 B1 | 4/2011 | Williams |
| 8,094,943 B2 | 1/2012 | Eaton et al. |
| 8,120,661 B2 | 2/2012 | Rabinowitz et al. |
| 8,328,653 B2 | 12/2012 | Lock |
| 8,379,926 B2 | 2/2013 | Kanhere et al. |
| 8,611,593 B2 | 12/2013 | Chen et al. |
| 8,718,327 B2 | 5/2014 | Tong et al. |
| 8,947,529 B2 | 2/2015 | Strine et al. |
| 9,171,390 B2 | 10/2015 | Sumner et al. |
| 9,300,871 B2 | 3/2016 | Zhou et al. |
| 9,418,320 B2 | 8/2016 | Chang et al. |
| 9,542,626 B2 | 1/2017 | Martinson et al. |
| 9,558,424 B2 | 1/2017 | Ramalingam et al. |
| 9,665,804 B2 | 5/2017 | Sarkis et al. |
| 9,716,832 B2 | 7/2017 | Ryu et al. |
| 9,756,248 B1 | 9/2017 | Wu et al. |
| 9,804,713 B2 | 10/2017 | Guarneri et al. |
| 9,854,168 B2 | 12/2017 | Wu et al. |
| 10,055,850 B2 | 8/2018 | Piekniewski et al. |
| 10,535,127 B1 | 1/2020 | Simonson et al. |
| 10,671,855 B2 | 6/2020 | Lee et al. |
| 10,705,525 B2 | 7/2020 | Smolyanskiy et al. |
| 10,769,799 B2 | 9/2020 | Jales Costa et al. |
| 11,253,953 B1 | 2/2022 | Lan et al. |
| 2002/0041339 A1 | 4/2002 | Diepold |
| 2004/0076324 A1 | 4/2004 | Burl et al. |
| 2008/0195316 A1 | 8/2008 | Krishnaswamy |
| 2014/0218555 A1 | 8/2014 | Kuo et al. |
| 2015/0003676 A1 | 1/2015 | Kuchiki |
| 2015/0310274 A1 | 10/2015 | Shreve et al. |
| 2015/0339589 A1 | 11/2015 | Fisher |
| 2016/0125245 A1 | 5/2016 | Saitwal et al. |
| 2016/0125621 A1 | 5/2016 | Saitwal et al. |
| 2016/0173787 A1 | 6/2016 | Yun |
| 2016/0180195 A1* | 6/2016 | Martinson ............ G06V 10/764 382/103 |
| 2016/0236790 A1 | 8/2016 | Knapp et al. |
| 2016/0292882 A1 | 10/2016 | Comport et al. |
| 2017/0053554 A1 | 2/2017 | Nalepka et al. |
| 2017/0053555 A1 | 2/2017 | Angel et al. |
| 2017/0206717 A1 | 7/2017 | Kühnapfel |
| 2017/0236252 A1 | 8/2017 | Nguyen et al. |
| 2017/0358119 A1 | 12/2017 | Forutanpour et al. |
| 2018/0024562 A1 | 1/2018 | Bellaiche |
| 2018/0218214 A1 | 8/2018 | Pestun et al. |
| 2019/0079535 A1 | 3/2019 | Zhu et al. |
| 2019/0114491 A1 | 4/2019 | Takaki |
| 2019/0271767 A1 | 9/2019 | Keilaf et al. |
| 2019/0286153 A1 | 9/2019 | Rankawat et al. |
| 2020/0053286 A1 | 2/2020 | Corona et al. |
| 2020/0065663 A1 | 2/2020 | Singh et al. |
| 2020/0065978 A1 | 2/2020 | Jales Costa et al. |
| 2020/0065980 A1* | 2/2020 | Jales Costa ............... G06T 7/11 |
| 2020/0111358 A1* | 4/2020 | Parchami ............ G05D 1/0231 |
| 2020/0116836 A1 | 4/2020 | Pacala et al. |
| 2020/0142421 A1 | 5/2020 | Palanisamy et al. |
| 2020/0189573 A1 | 6/2020 | King et al. |
| 2020/0293064 A1 | 9/2020 | Wu et al. |
| 2020/0380763 A1 | 12/2020 | Abramov |
| 2020/0394917 A1 | 12/2020 | Jales Costa et al. |
| 2020/0409385 A1 | 12/2020 | Chakravarty et al. |

FOREIGN PATENT DOCUMENTS

| | | |
|---|---|---|
| CN | 102592112 B | 1/2014 |
| CN | 103077531 B | 11/2015 |
| CN | 106952474 A | 7/2017 |
| CN | 108230367 A | 6/2018 |
| CN | 110737834 A | 1/2020 |
| CN | 110858316 A | 3/2020 |
| CN | 1119861128 A | 11/2020 |
| CN | 112146618 A | 12/2020 |
| DE | 102019122402 A1 | 2/2020 |
| DE | 102020113848 A1 | 11/2020 |
| WO | 2016108847 A1 | 7/2016 |
| WO | 2017206999 A1 | 12/2017 |
| WO | 2018170393 A2 | 9/2018 |

OTHER PUBLICATIONS

Notice of Allowance as issued for U.S. Appl. No. 16/421,563 as filed with the USPTO on May 24, 2019.
Non-Final Office Action for U.S. Appl. No. 16/456,192 as issued by the USPTO on Jul. 26, 2022.
Notice of Allowance for U.S. Appl. No. 16/437,292 as issued by the USPTO on Jul. 27, 2022.
Angelov, "Outside the Box: An Alternative Data Analytics Frame-Work", Journal of Automation, Mobile Robotics & Intelligent Systems, Vo. 8, No. 2, 2014 (7 pages).
Wang, et al., "An Optimization Clustering Algorithm Based on Texture Feature Fusion for Color Image Segmentation", Algorithms, Jun. 2015, retrieved from Internet URL: https://www.researchgate.net/publication/277019137, pp. 234-247 (15 pages).
Chen, et. al., "Object-Based Features for House Detection from RGB High-Resolution Images", MDPI Remote Sensing 2018, 10, 451, retrieved from Internet URL: www.mdpi.com/journal/remotesensing (24 pages).
David Nister, et al., "Visual Odometry for Ground Vehicle Applications", published in Journal of Field Robotics, Jan. 26, 2006 (35 pages).
The 20BN-jester Dataset V1, retrieved from Internet URL: https://20bn.com/datasets/jester, Mar. 27, 2019 (6 pages).
Non-Final Office Action for U.S. Appl. No. 16/155,048, filed Oct. 9, 2018, as issued by the USPTO on Jan. 31, 2023.
Notice of Allowance for U.S. Appl. No. 16/456,192, filed Jun. 28, 2019, as issued by the USPTO on Jan. 31, 2023.
Hayakawa, J. et al., "Ego-Motionand Surrounding Vehicle State Estimation Using a Monocular Camera," IEEE Intelligent Vehicle Symposium, Jun. 2019, 7 pages.
Cao, Y. et al., "Vehicle Ego-Motion Estimation by Using Pulse-Coupled Neural Network," International Machine Vision and Image Processing Conference, 2007, 7 pages.
Sridhar, S. et al., "Vision Based Tunnel Detection for Driver Assistance System," IEEE, 2014, 4 pages.

(56) References Cited

OTHER PUBLICATIONS

Kim, J., et al., "Foreground Objects Detection by U-Net with Multiple Difference Images," Applied Sciences, Feb. 18, 2021, 19 pages.

* cited by examiner

OBJECT DETECTION

BACKGROUND

Images can be acquired by sensors and processed using a computer to determine data regarding objects in an environment around a system. Operation of a sensing system can include acquiring accurate and timely data regarding objects in the system's environment. A computer can acquire images from one or more images sensors that can be processed to determine locations of objects. Object location data extracted from images can be used by a computer to operate systems including vehicles, robots, security, and object tracking systems.

DETAILED DESCRIPTION

Figure 1:
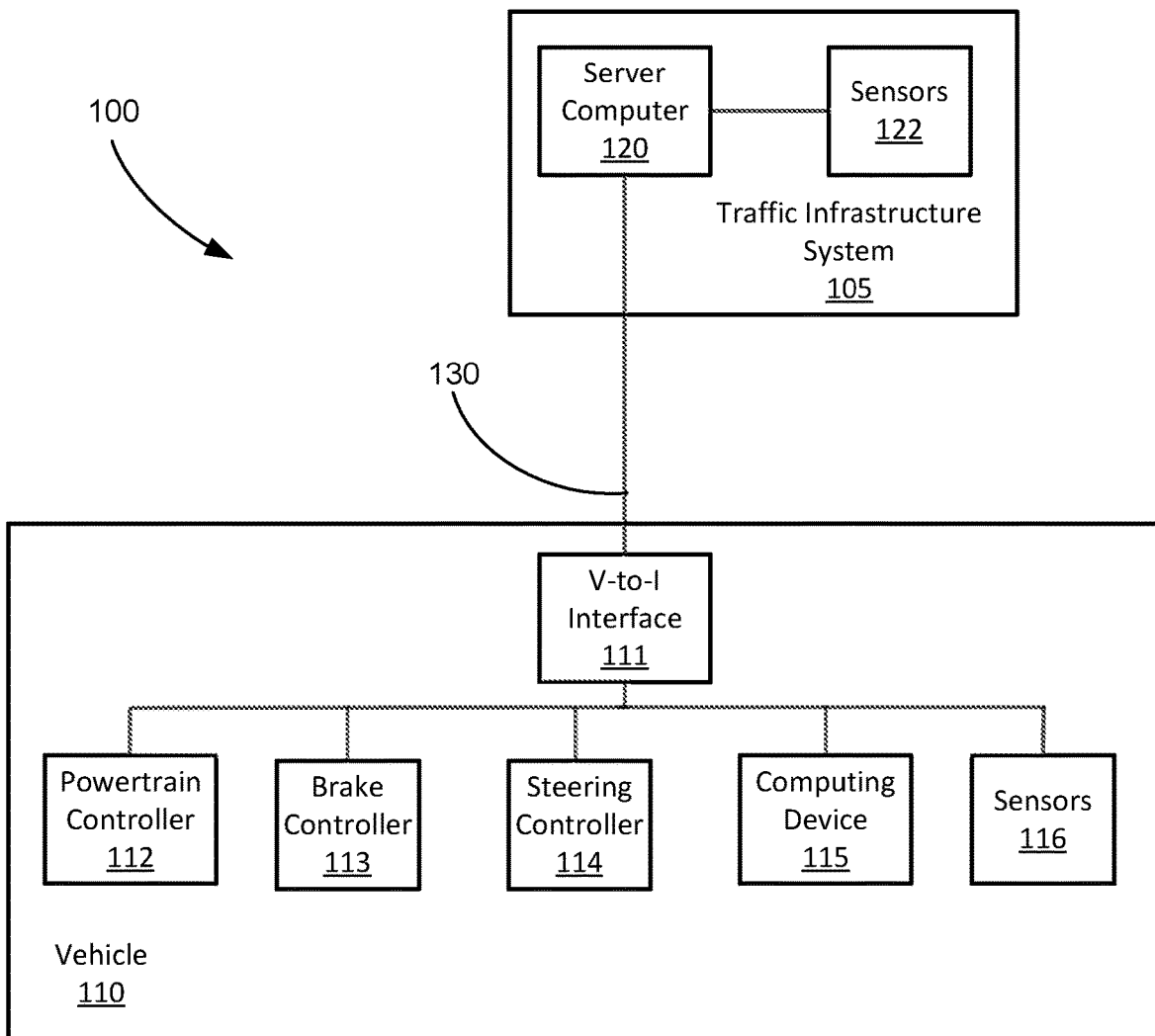
FIG. 1 is a block diagram of an example traffic infrastructure system.

A sensing system can acquire data, for example image data, regarding an environment around the system and process the data to determine identities and/or locations of objects. For example, a deep neural network (DNN) can be trained and then used to determine objects in image data acquired by sensors in systems including vehicle guidance, robot operation, security, manufacturing, and product tracking. Vehicle guidance can include operation of vehicles in autonomous or semi-autonomous modes in environments that include a plurality of objects. Robot guidance can include guiding a robot end effector, for example a gripper, to pick up a part and orient the part for assembly in an environment that includes a plurality of parts. Security systems include features where a computer acquires video data from a camera observing a secure area to provide access to authorized users and detect unauthorized entry in an environment that includes a plurality of users. In a manufacturing system, a DNN can determine the location and orientation of one or more parts in an environment that includes a plurality of parts. In a product tracking system, a deep neural network can determine a location and orientation of one or more packages in an environment that includes a plurality of packages.

Vehicle guidance will be described herein as a non-limiting example of using a computer to detect objects, for example vehicles and pedestrians, in a traffic scene and determine a vehicle path for operating a vehicle based on the detected objects. A traffic scene is an environment around a traffic infrastructure system or a vehicle that can include a portion of a roadway and objects including vehicles and pedestrians, etc. For example, a computing device in a traffic infrastructure system can be programmed to acquire one or more images from one or more sensors included in the traffic infrastructure system, detect objects in the images and communicate labels that identify the objects along with locations of the objects. The sensors can include video or still image cameras that acquire images corresponding to visible or infrared wavelengths of light. The sensors can be stationary and can be mounted on poles, buildings, or other structures to give the sensors a view of the traffic scene including objects in the traffic scene. Sensors can also include lidar sensors, which typically emit infrared wavelengths of light, radar sensors which emit radio waves, and ultrasound sensors which emit sound waves. Lidar, radar, and ultrasound sensors all measure distances to points in the environment.

In some examples stationary sensors included in a traffic infrastructure system can acquire one or more images of a traffic scene and process the images to determine locations of objects included in the images. The location of the objects can be communicated to a vehicle to permit a computing device in the vehicle to determine a vehicle path upon which to operate the vehicle. Stationary sensors included in a traffic infrastructure system can be mounted on poles, buildings, or other structures to provide an overview of a traffic scene and provide data regarding objects in a traffic scene to augment data acquired by sensors included in the vehicle, for example.

Advantageously, techniques discussed herein improve the ability of a traffic infrastructure system to provide stationary sensor data to vehicles, including by decreasing the time and computing resources required to determine objects in image data. Techniques discussed herein use eccentricity analysis to determine portions of images that include moving objects. Portions of images that do not include moving objects can be masked off, i.e., set to zero. The masked images can be converted to a compressed dense matrix that includes only portions of the image that includes moving objects. A convolutional neural network can be determined that inputs a compressed dense matrix and detects objects based on rulebooks rather than arithmetic convolutions, thereby decreasing the time and computing resources required to detect moving objects in image data.

A method is disclosed, including determining a segmentation mask that includes at least one moving object in a plurality of images based on determining eccentricity for each pixel location in the plurality of images, segmenting a first image included in the plurality of images by applying the segmentation mask to the image and transforming the segmented first image to a compressed dense matrix which includes pixel values for non-zero portions of the segmented first image. The compressed dense matrix can be input to a sparse convolutional neural network trained to detect objects and a detected object corresponding to the at least one moving object included in the first image can be output from the sparse convolutional neural network. A vehicle can be operated by determining a vehicle path based on the detected object. Operating the on the vehicle path can include controlling one or more of vehicle powertrain, vehicle steering, and vehicle brakes. The plurality of images can correspond to images acquired at a plurality of time steps by a camera viewing a traffic scene. The at least one moving object can include one or more of a vehicle and a pedestrian.

The pixel locations can correspond to pixel addresses in a rectangular array of pixels included in each of the plurality of images. the eccentricity can be determined based on determining a mean pixel value for each pixel location and a variance for each pixel location. Pixels of the segmented first image can be set to the eccentricity when the eccentricity is greater than a user-determined threshold and zero when the eccentricity is less than a user-determined threshold. Applying the segmentation mask to the first image can include determining a logical AND between each pixel of the segmentation mask and a corresponding pixel of the first image. The compressed dense matrix can include an x, y pixel address and a pixel value for each non-zero pixel included in the segmented first image. The sparse convolutional neural network can input the compressed dense matrix and outputs an array which includes an x, y pixel address of a bounding box and an object label corresponding to an object class. The sparse convolutional neural network can include a plurality of convolutional layers and a plurality of max pooling layers. The sparse convolutional neural network can be trained to detect objects based on a training dataset that includes a plurality of sets of images and ground truth data corresponding to moving objects included in the pluralities of sets of images, respectively. The ground truth data can include object labels and bounding boxes corresponding to object locations for the moving objects included in the plurality of sets of images.

Further disclosed is a computer readable medium, storing program instructions for executing some or all of the above method steps. Further disclosed is a computer programmed for executing some or all of the above method steps, including a computer apparatus, programmed to determine a segmentation mask that includes at least one moving object in a plurality of images based on determining eccentricity for each pixel location in the plurality of images, segment a first image included in the plurality of images by applying the segmentation mask to the image and transform the segmented first image to a compressed dense matrix which includes pixel values for non-zero portions of the segmented first image. The compressed dense matrix can be input to a sparse convolutional neural network trained to detect objects and a detected object corresponding to the at least one moving object included in the first image can be output from the sparse convolutional neural network. A vehicle can be operated by determining a vehicle path based on the detected object. Operating the on the vehicle path can include controlling one or more of vehicle powertrain, vehicle steering, and vehicle brakes. The plurality of images can correspond to images acquired at a plurality of time steps by a camera viewing a traffic scene. The at least one moving object can include one or more of a vehicle and a pedestrian.

The instructions can include further instructions to determine pixel locations corresponding to pixel addresses in a rectangular array of pixels included in each of the plurality of images. the eccentricity can be determined based on determining a mean pixel value for each pixel location and a variance for each pixel location. Pixels of the segmented first image can be set to the eccentricity when the eccentricity is greater than a user-determined threshold and zero when the eccentricity is less than a user-determined threshold. Applying the segmentation mask to the first image can include determining a logical AND between each pixel of the segmentation mask and a corresponding pixel of the first image. The compressed dense matrix can include an x, y pixel address and a pixel value for each non-zero pixel included in the segmented first image. The sparse convolutional neural network can input the compressed dense matrix and outputs an array which includes an x, y pixel address of a bounding box and an object label corresponding to an object class. The sparse convolutional neural network can include a plurality of convolutional layers and a plurality of max pooling layers. The sparse convolutional neural network can be trained to detect objects based on a training dataset that includes a plurality of sets of images and ground truth data corresponding to moving objects included in the pluralities of sets of images, respectively. The ground truth data can include object labels and bounding boxes corresponding to object locations for the moving objects included in the plurality of sets of images.

FIG. 1 is a diagram of a sensing system 100 that can include a traffic infrastructure system 105 that includes a server computer 120 and stationary sensors 122. Sensing system 100 includes a vehicle 110, operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

Figure 2:
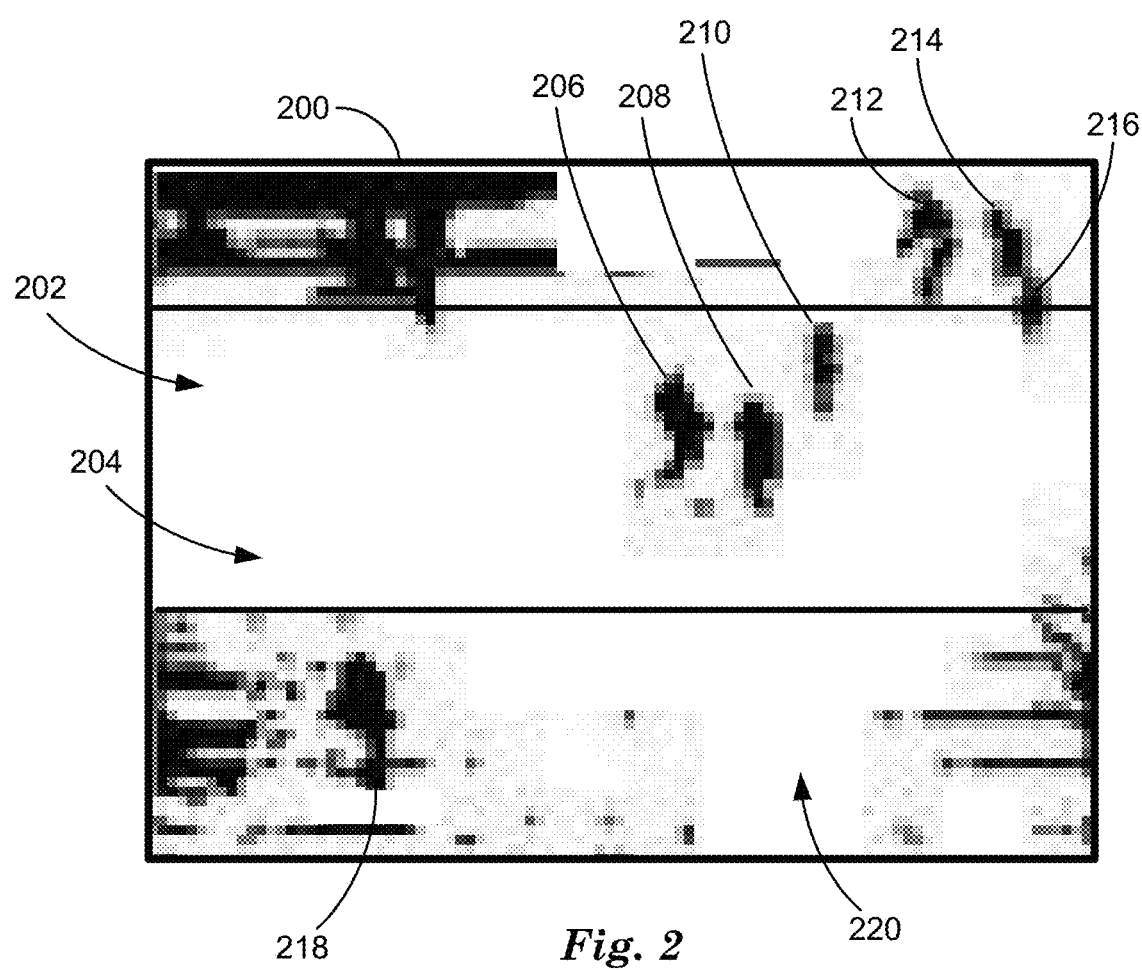
FIG. 2 is a diagram of an example image of a traffic scene.

FIG. 2 is a diagram of an image 200 of a traffic scene 202. Traffic scene 202 includes a roadway 204, and pedestrians 206, 208, 210, 212, 214, 216, 218. Pedestrians can be referred to collectively as moving objects 220. The image 200 of traffic scene 202 can be acquired by a sensor 122 included in a traffic infrastructure system 105. Sensor 122 can be a stationary camera. Other types of stationary sensors 122 can include lidar, radar, or ultrasound, for example. The stationary camera can be mounted on a camera mount, which can include traffic signal poles, light poles, purpose-built poles or mounts, buildings, or existing structures such as bridges, overpasses, or sign poles. The stationary camera can acquire monochrome or color images in visible or infrared frequency ranges. The stationary camera can be a video camera which can acquire a plurality of images in a brief time period for example up to 60 video frames per second. Because the camera is stationary, pixels included in the background portions of the image remain unchanged from image to image. Pixels included in the foreground, including moving objects, typically change value from image to image as the objects move with respect to the background.

Figure 3:
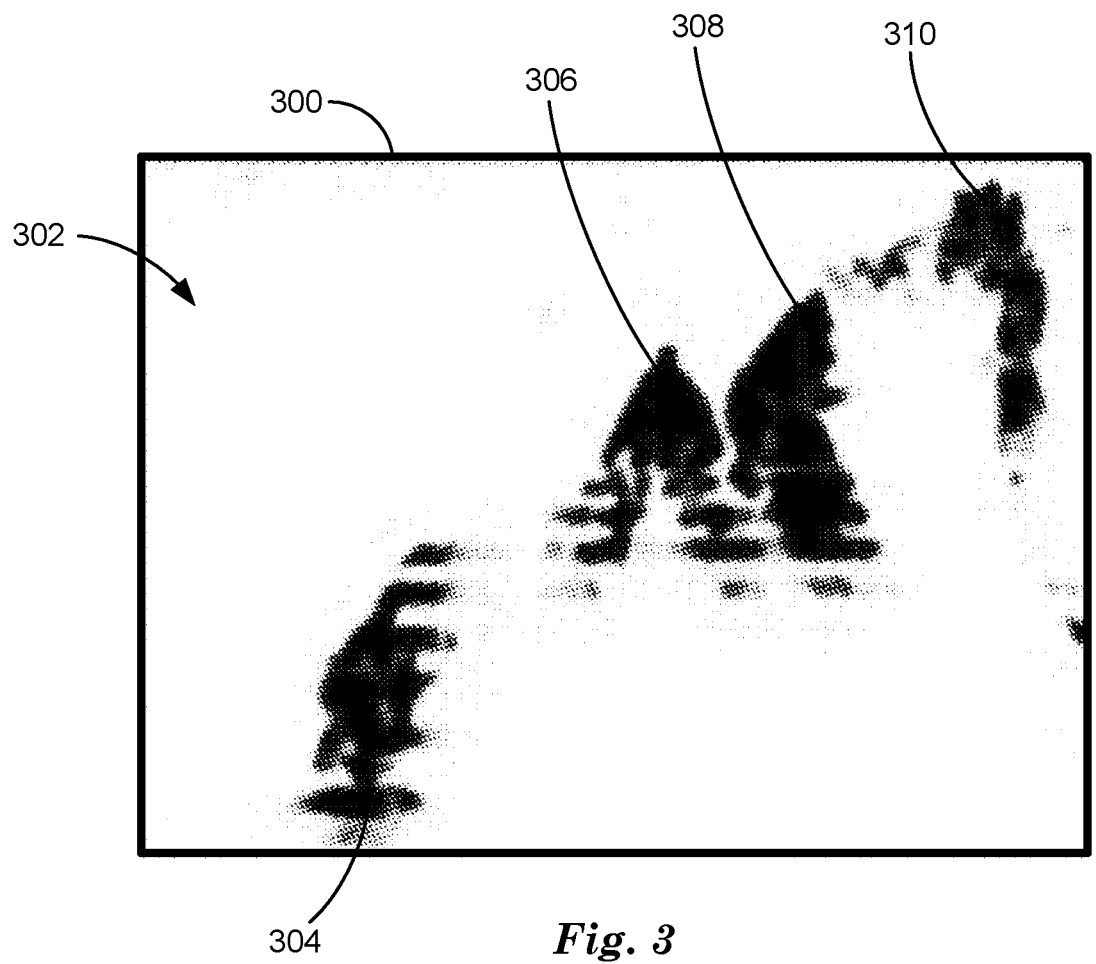
FIG. 3 is a diagram of an example eccentricity map based on image of a traffic scene.

FIG. 3 is a diagram of an eccentricity image 300 produced by performing eccentricity analysis on a plurality of images 200 of the traffic scene 202 from FIG. 2. Eccentricity image 300 includes a background region (white pixels) 302 and foreground regions (black pixels) 304, 306, 308, 310. The foreground regions 304, 306, 308, 310 correspond to moving objects 220 included in image 200 of FIG. 2. Eccentricity analysis is a technique for segmenting an image based on detecting moving objects. Segmenting an image means dividing an image into portions based on properties of the image data. Eccentricity analysis segments images into background regions, where the image pixels do not change in value between subsequent images and foreground regions, where the image pixels change in value, typically because they correspond to one or more moving objects.

That is, eccentricity analysis is a technique for representing dynamic visual data in a static image. Eccentricity analysis recursively calculates static images in a pixel-wise manner to summarize motion in a plurality of images acquired at a plurality of time steps. An eccentricity $\varepsilon_k$ for a pixel $x_k$ at a time k is determined by recursively calculating a mean pixel value $\mu_k$ and variance $\sigma_k^2$ for the respective pixels of a plurality of images according to the equation:

$$\varepsilon_k = \frac{1}{k} + \frac{(\mu_k - x_k)^T(\mu_k - x_k)}{k\sigma_k^2} \quad (1)$$

Where the mean is determined by:

$$\mu_k = \frac{k-1}{k}\mu_{k-1} + \frac{x_k}{k} \quad (2)$$

And $$\sigma_k^2 = \frac{k-1}{k}\sigma_{k-1}^2 + \frac{(\mu_k - x_k)^T(\mu_k - x_k)}{k-1} \quad (3)$$

Pixel locations in a sequence of images 200 that do not include moving objects will have eccentricities $\varepsilon_k$ that are less than a user-determined threshold defined as:

$$\varepsilon_k > \frac{m^2 + 1}{2k} \quad (4)$$

Where m is a user-determined value, typically m=3. The value of m can be determined by selecting a value of m that results in an eccentricity image 300 with regions that correspond to moving objects. Pixel locations that have an eccentricity $\varepsilon_k$ less than the threshold are set to zero, while pixel locations that have an eccentricity $\varepsilon_k$ greater than the threshold are set to the value of the eccentricity $\varepsilon_k$. Eccentricity image 300 can be used to form a segmentation mask by setting all pixels with non-zero values to "1", for example.

Figure 4:
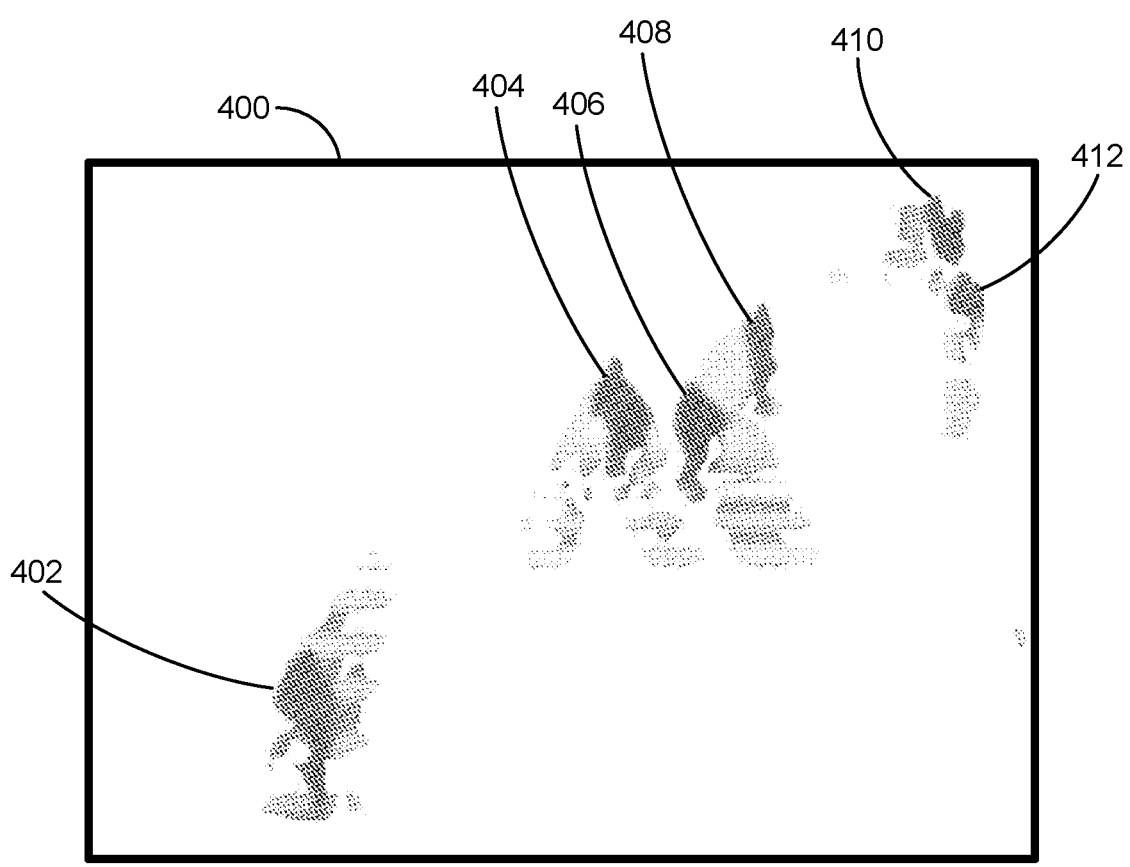
FIG. 4 is a diagram of an example image of a traffic scene masked using an eccentricity map.

FIG. 4 is a diagram of a masked image 400, formed by ANDing a segmentation mask based on eccentricity image 300 with image 200 of traffic scene 202. "ANDing" is an image operation which a logical AND is performed on corresponding pixels of two images. Pixels with value zero in the segmentation mask will result in pixels with zero value in masked image 400, while pixels with value "1" in the segmentation mask will result in pixels with values equal to their value in image 200. Masked image 400 includes moving objects 402, 404, 406, 408, 410, 412 corresponding to pedestrians 206, 208, 210, 212, 214, 216, 218 included in image 200 in FIG. 2.

Masked image 400 can be prepared for processing by a sparse convolutional neural network by first transforming masked image 400 into a compressed dense matrix. A masked image can be transformed into a compressed dense matrix by scanning the masked image 400, typically in raster-scan order from upper left to lower right along rows. As the masked image 400 is scanned, pixel values of non-zero pixels are entered into an array that includes the x, y address of the pixel in a rectangular array of pixels corresponding to the image. The pixel value can be three numbers corresponding to the red, green, and blue (RGB) color values of the pixel, for example. In this fashion, the compressed dense matrix will only include non-zero values from the masked image 400, thereby reducing the number of values to be processed by the sparse convolutional neural network.

Figure 5:
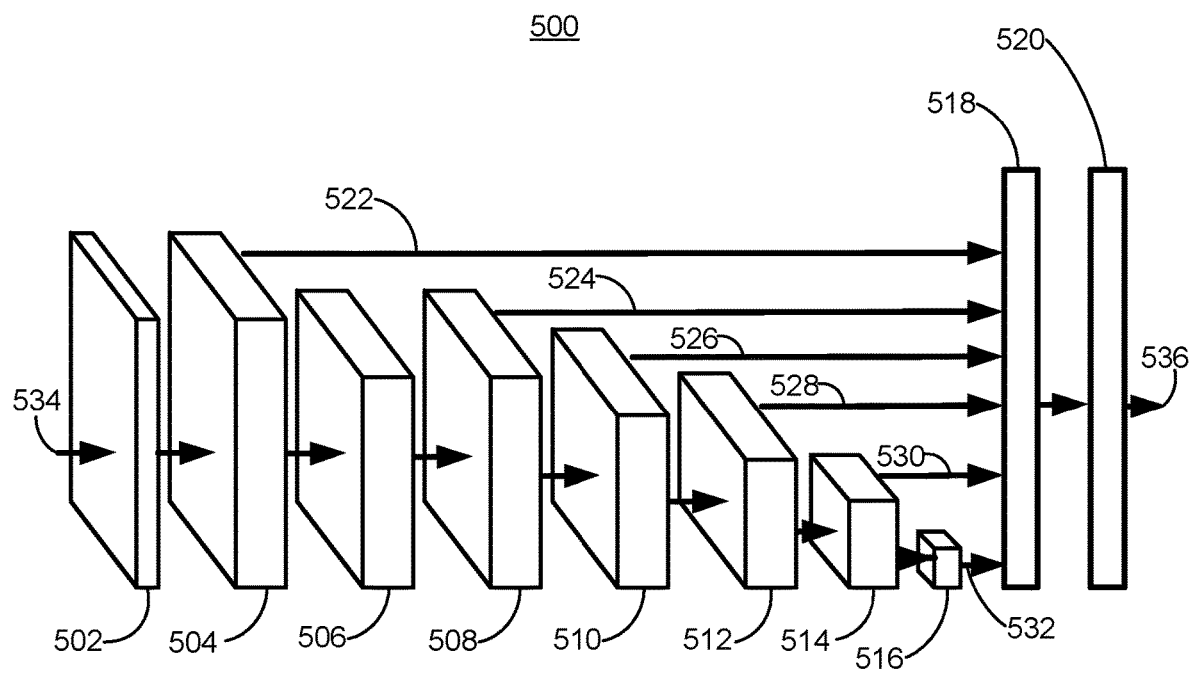
FIG. 5 is a diagram of an example convolutional neural network.

FIG. 5 is a diagram of a sparse convolutional neural network 500. Sparse convolutional neural network includes convolutional layers 502, 504, 506, 508, 510, 512, 514, 516. Image data 534 is input to first convolutional layer 502, convolved with one or more convolutional kernels, processed with optional max pooling layers that reduce the x, y resolution of the data and passed onto succeeding convolutional layers 504, 506, 508, 510, 512, 514, 516. Intermediate results 522, 524, 526, 528, 530 and final results 532 are passed to detection layer 518 to detect classes of moving objects. Moving object classes can include pedestrian and vehicle, for example. Detected object classes are passed to non-maximal suppression layer 520 to eliminate all results except locally maximal detected object classes and then output 536. Convolutional neural networks are discussed in "SSD: Single Shot MultiBox Detector", by Wei Liu, et.al., arXiv:1512.02325v5 [cs.CV] 29 Dec. 2016, arXive.org, available as of the filing date of this application.

A regular convolutional neural network 500 is adapted to form a sparse convolutional neural network 500 by replacing the convolution operations included in the convolutional layers 504, 506, 508, 510, 512, 514, 516 with a rulebook. Sparse convolution, as is known, collects all operations with references to convolution kernel elements and saves them in a rulebook as instructions for computation. A rulebook pre-calculates the results of performing convolutions on pixel data and stores the pre-calculated results in a table. Pixel values from a compressed dense matrix are input to the rulebook which looks up the results in the table and applies the results to an output compressed dense matrix to be passed onto the next layer of the sparse convolutional neural network. Sparse convolution is efficient because scanning all the pixels of an input image is not required. Sparse convolution only calculates convolutions for the non-zero elements included in the compressed dense matrix corresponding to non-zero pixels in the masked image 400. Using a rulebook to rewrite sparse convolution into a compact matrix multiplication problem reduces the number of convolution computations by eliminating unnecessary convolution computations having zeros as output values. Reducing input image 200 data using eccentricity $\varepsilon_k$ to determine a compressed dense matrix of pixel values and processing the compressed dense matrix of pixel values with a sparse convolutional neural network 500 can advantageously reduce the time and computing resources required to determine bounding boxes 620 corresponding to moving objects in image 600 data.

Sparse convolutional neural networks are 500 trained in the same fashion as convolutional neural networks. A training dataset is acquired that includes pluralities of set of images of moving objects. The sets of images include image in sequences appropriate for performing eccentricity analysis. The training dataset is analyzed by users to label and locate moving objects in the image data to form ground truth data. Moving object labels determine to which class of moving objects the moving object belongs. The images in the training dataset are then processed using eccentricity analysis and sparse convolutional neural networks as discussed above in relation to FIGS. 3-5. A loss function is determined that compares the output from the sparse convolutional neural network 500 with the ground truth corresponding to the input image data. The loss function is used to select weights for the parameters that control the processing of the convolutional layers including the rulebooks that provide output that most closely matches the ground truth. The trained sparse convolutional neural network can output the x, y pixel addresses of a bounding box and an object label that identifies the object as belonging to one of the object classes included in the training dataset, for example pedestrian or vehicle.

Figure 6:
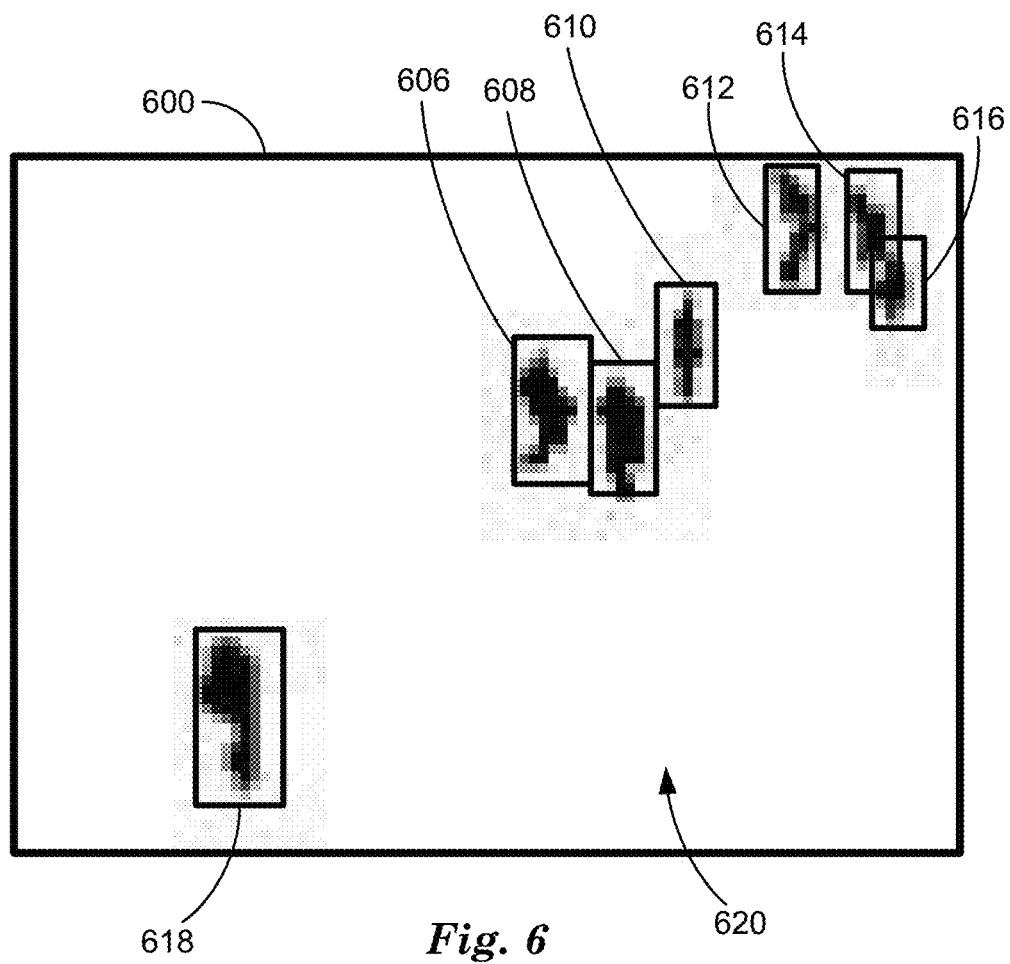
FIG. 6 is a diagram of example objects detected in masked traffic scene using a sparse convolutional neural network.

FIG. 6 is an output image 600 that includes bounding boxes 606, 608, 610, 612, 614, 616, 618 collectively bounding boxes 620 corresponding to pedestrians 206, 208, 210, 212, 214, 216, 218 included in image 200 in FIG. 2. Object labels corresponding to object classes and pixel coordinates of bounding boxes 620 corresponding to object locations are output from sparse convolutional neural network 500 in response to a compressed dense matrix of pixel values. The compressed dense matrix of pixel values corresponds to an image 200 segmented using an eccentricity image 300 to form a masked image 400 and then transformed into a compressed dense matrix. The object labels and pixel coordinates of the bounding boxes 620 are then applied to the image 200 to identify moving objects 220, i.e., pedestrians in the image 200. The object labels and pixel coordinates of bounding boxes 620 corresponding to locations of moving objects can be communicated to a vehicle 110 by a traffic infrastructure system 105 to assist the vehicle in operating by determining a vehicle path that avoids moving objects 220. A vehicle path is a polynomial function that includes upper and lower limits on lateral and longitudinal accelerations by the vehicle 110 following the vehicle path. A computing device 115 in a vehicle 110 can operate the vehicle 110 along a vehicle path by controlling one or more of vehicle powertrain, vehicle steering and vehicle brakes using controllers 112, 113, 114.

Figure 7:
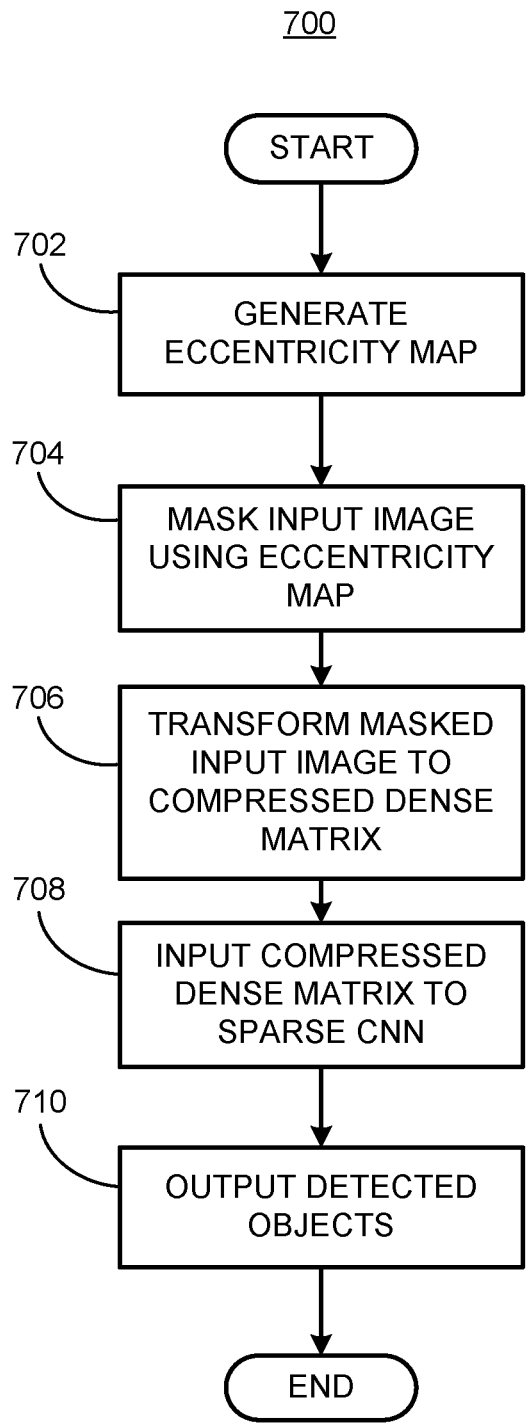
FIG. 7 is a flowchart diagram of an example process to determine objects in image data using eccentricity analysis and a sparse convolutional neural network.

FIG. 7 is a diagram of a flowchart, described in relation to FIGS. 1-6, of a process for detecting moving objects in image data acquired by a stationary sensor 122 included in a traffic infrastructure system 105. Process 700 can be implemented by a processor of a server computer 120, taking as input image data from stationary sensors 122, and executing commands, and outputting detected bounding boxes 620 corresponding to moving objects. Process 700 includes multiple blocks that can be executed in the illustrated order. Process 700 could alternatively or additionally include fewer blocks or can include the blocks executed in different orders.

Process 700 begins at block 702, where a server computer 120 determines an eccentricity image 300 by determining eccentricity $\varepsilon_k$ values for the pixels of a plurality of input images 200 acquired by a stationary sensor 122 included in a traffic infrastructure system 105 as discussed in relation to FIG. 3, above.

At block 704 server computer 120 masks an input image 200 with a segmentation mask based on the eccentricity image 300 to form a masked image 400 that includes RGB pixel values corresponding to moving objects 220 and zeros otherwise as discussed above in relation to FIG. 4.

At block 706 server computer 120 transforms a masked image 400 to generate a compressed dense matrix of pixel values corresponding to the non-zero pixels of a masked image 400 as discussed in relation to FIG. 4, above.

At block 708 the compressed dense matrix of non-zero pixel values in input to a sparse convolutional neural network 500 to determine pixel addresses of bounding boxes 620 corresponding to moving objects included in an image 600 as discussed above in relation to FIGS. 5 and 6, above.

At block 710 the bounding boxes 620 corresponding to moving objects included in an image 600 are output by server computer 120. The 710 the bounding boxes 620 corresponding to moving objects included in an image 600 can be output to a computing device 115 included in a vehicle 110, for example. After block 710 process 700 ends.

Figure 8:
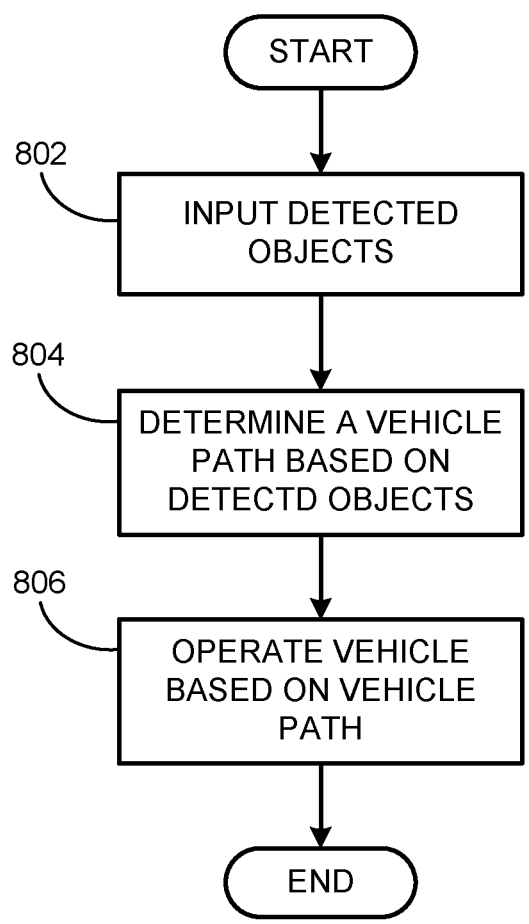
FIG. 8 is a flowchart diagram of an example process to operate a vehicle based on determined objects.

FIG. 8 is a diagram of a flowchart, described in relation to FIGS. 1-7, of a process for operating a vehicle 110 based on bounding boxes 620 corresponding to moving objects downloaded from a traffic infrastructure system 105. Process 800 can be implemented by a processor of a computing device 115, taking as input data from server computer 120, and executing commands, and operating vehicle 110. Process 800 includes multiple blocks that can be executed in the illustrated order. Process 800 could alternatively or additionally include fewer blocks or can include the blocks executed in different orders.

Process 800 begins at block 802, where a computing device 115 in a vehicle 110 downloads bounding boxes 620 corresponding to moving objects included in an image 600 output by server computer 120, for example. The computing device 115 can download the bounding boxes 620 corresponding to moving objects included in an image 600 via a network 130, for example.

At block 804 computing device 115 determines a vehicle path based on the bounding boxes 620 corresponding to moving objects included in an image 600. A vehicle path can be described with a polynomial function or equation that includes maximum and minimum lateral and longitudinal accelerations to be applied to vehicle motion as it travels along the vehicle path. Because eccentricity analysis and sparse convolutional neural networks permit determination of bounding boxed 620 corresponding to moving objects quickly using limited computer resources, a plurality of successive images 600 including bounding boxes 620 corresponding to moving objects can be determined by server computer 120, permitting server computer 120 or computing device 115 to track moving objects in real time, permitting computing device 115 to determine a vehicle path based on predicting locations of moving objects.

At block 806 computing device 115 outputs commands to one or more controllers 112, 113, 114, e.g., to control vehicle powertrain, vehicle steering, and/or vehicle brakes to control vehicle motion to operate vehicle 110 along the vehicle path determined at block 804. Following block 806 process 800 ends.

Computing devices such as those discussed herein generally each includes commands executable by one or more computing devices such as those identified above, and for carrying out blocks or steps of processes described above.

For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
a processor; and
a memory, the memory including instructions executable by the processor to:
determine a segmentation mask that includes at least one moving object in a plurality of images based on determining eccentricity for each pixel location in the plurality of images;
segment a first image included in the plurality of images by applying the segmentation mask to the image;
transform the segmented first image to a compressed dense matrix which includes pixel values for non-zero portions of the segmented first image;
input the compressed dense matrix to a sparse convolutional neural network trained to detect objects; and
output a detected object corresponding to the at least one moving object included in the first image from the sparse convolutional neural network.

2. The computer of claim 1, the instructions including further instructions to operate a vehicle by determining a vehicle path based on the detected object.

3. The computer of claim 2, wherein operating the vehicle on the vehicle path includes controlling one or more of vehicle powertrain, vehicle steering, and vehicle brakes.

4. The computer of claim 1, wherein the plurality of images corresponds to images acquired at a plurality of time steps by a camera viewing a traffic scene.

5. The computer of claim 1, wherein the at least one moving object includes one or more of a vehicle and a pedestrian.

6. The computer of claim 1, wherein the pixel locations correspond to pixel addresses in a rectangular array of pixels included in each of the plurality of images.

7. The computer of claim 1, wherein the eccentricity is determined based on determining a mean pixel value for each pixel location and a variance for each pixel location.

8. The computer of claim 1, wherein pixels of the segmented first image are set to the eccentricity when the eccentricity is greater than a user-determined threshold and zero when the eccentricity is less than a user-determined threshold.

9. The computer of claim 1, wherein applying the segmentation mask to the first image includes determining a logical AND between each pixel of the segmentation mask and a corresponding pixel of the first image.

10. The computer of claim 1, wherein the compressed dense matrix includes an x, y pixel address and a pixel value for each non-zero pixel included in the segmented first image.

11. The computer of claim 10, wherein the sparse convolutional neural network inputs the compressed dense matrix and outputs an array which includes an x, y pixel address of a bounding box and an object label corresponding to an object class.

12. The computer of claim 1, wherein the sparse convolutional neural network includes a plurality of convolutional layers and a plurality of max pooling layers.

13. The computer of claim 1, wherein the sparse convolutional neural network is trained to detect objects based on a training dataset that includes a plurality of sets of images and ground truth data corresponding to moving objects included in the pluralities of sets of images, respectively.

14. The computer of claim 13, wherein the ground truth data includes object labels and bounding boxes corresponding to object locations for the moving objects included in the plurality of sets of images.

15. A method, comprising:

determining a segmentation mask that includes at least one moving object in a plurality of images based on determining eccentricity for each pixel location in the plurality of images;

segmenting a first image included in the plurality of images by applying the segmentation mask to the image;

transforming the segmented first image to a compressed dense matrix which includes pixel values for non-zero portions of the segmented first image;

inputting the compressed dense matrix to a sparse convolutional neural network trained to detect objects; and outputting a detected object corresponding to the at least one moving object included in the first image from the sparse convolutional neural network.

16. The method of claim 15, further comprising operating a vehicle by determining a vehicle path based on the detected object.

17. The method of claim 16, wherein operating the vehicle on the vehicle path includes controlling one or more of vehicle powertrain, vehicle steering, and vehicle brakes.

18. The method of claim 15, wherein the plurality of images corresponds to images acquired at a plurality of time steps by a camera viewing a traffic scene.

19. The method of claim 15, wherein the at least one moving object includes one or more of a vehicle and a pedestrian.

20. The method of claim 15, wherein the pixel locations correspond to pixel addresses in a rectangular array of pixels included in each of the plurality of images.

* * * * *